US006453106B1

(12) United States Patent
Glaser et al.

(10) Patent No.: US 6,453,106 B1
(45) Date of Patent: Sep. 17, 2002

(54) METHOD AND APPARATUS FOR A CABLE LOCATION AND PROTECTION SYSTEM

(75) Inventors: Ronald William Glaser, Ector, TX (US); Justin Minchey, Leonard, TX (US); Benny John Whitehead, Ector, TX (US)

(73) Assignee: GE-ACT Communications, Inc., Bonham, TX (US)

( * ) Notice: Subject to any disclaimer, the term of this patent is extended or adjusted under 35 U.S.C. 154(b) by 29 days.

(21) Appl. No.: 09/609,186

(22) Filed: Jun. 30, 2000

(51) Int. Cl.[7] .............................. G02B 6/00; G02B 6/36
(52) U.S. Cl. ...................................... 385/134; 385/135
(58) Field of Search ................................. 385/100, 101, 385/134, 135, 136, 137; 361/119, 136; 174/5 R, 55 G

(56) References Cited

U.S. PATENT DOCUMENTS

| | | | |
|---|---|---|---|
| 3,668,640 A | 6/1972 | Driscoll | 340/167 B |
| 4,259,542 A | 3/1981 | Tehan et al. | 174/48 |
| 4,263,317 A | 4/1981 | Baumbach | 361/124 |
| 4,268,115 A * | 5/1981 | Slemon et al. | 385/92 |
| 4,410,850 A | 10/1983 | Pesto et al. | 324/52 |
| 4,434,396 A | 2/1984 | Montague | 323/230 |
| 4,554,401 A | 11/1985 | Ball | 174/78 |
| 4,554,608 A | 11/1985 | Block | 361/119 |
| 4,740,859 A | 4/1988 | Little | 361/56 |
| 4,743,997 A | 5/1988 | Carpenter, Jr. | 361/118 |
| 4,760,485 A | 7/1988 | Ari et al. | 361/54 |
| 4,802,055 A | 1/1989 | Beckerman | 361/56 |
| 4,870,534 A | 9/1989 | Harford | 361/58 |
| 4,903,161 A | 2/1990 | Huber et al. | 361/56 |
| 5,007,701 A | 4/1991 | Roberts | 350/96.2 |
| 5,053,910 A | 10/1991 | Goldstein | 361/111 |
| 5,101,180 A | 3/1992 | Frey | 361/111 |
| 5,148,133 A | 9/1992 | Zennamo, Jr. et al. | 333/175 |
| 5,157,750 A * | 10/1992 | Grace et al. | 385/76 |
| 5,198,775 A | 3/1993 | Bussinger et al. | 324/544 |
| 5,224,878 A | 7/1993 | Lurie et al. | 439/620 |
| 5,485,745 A * | 1/1996 | Rademaker et al. | 73/152.39 |
| 5,553,183 A * | 9/1996 | Bechamps | 385/95 |
| 5,652,820 A | 7/1997 | Glaser et al. | 385/135 |
| 5,721,662 A | 2/1998 | Glaser et al. | 361/119 |
| 5,886,300 A * | 3/1999 | Strickler | 174/135 |
| 5,930,415 A * | 7/1999 | Pham | 385/13 |
| 5,966,477 A * | 10/1999 | Johnson | 385/12 |
| 6,212,310 B1 * | 4/2001 | Waarts et al. | 385/24 |

OTHER PUBLICATIONS

Continuation application Ser. No. 08/923,229, filed on Sep. 4, 1997, entitled: Floating Ground Isolator for a Communications Cable Locating System; by Ronald W. Glaser and James A. Glaser. (Pending Status).
"700 Universal Splice Closure" Section 700–100, ACT Practice, ACT Communications, Inc., Nov. 1988, 11 pages.
ACT 44X Basic Schematic, ACT Communications, Inc., Jun. 1992, one page.

* cited by examiner

Primary Examiner—Brian Sircus
Assistant Examiner—Michael C. Zarroli
(74) Attorney, Agent, or Firm—Carr Law Firm, L.L.P.

(57) ABSTRACT

A method and an apparatus for protecting fiber-optic cable bundle closures includes a quick disconnect that allows for cabling to the closure to be separated upon the presence of a sudden jerk or pulling force. Additionally, a plurality of quick disconnects are used to effective create modular components out of a fiber-optic cable bundle that, heretofore, has be permanently attached to each other. The quick disconnects are rendered water resistant with the use of rubber boots that cover the quick disconnects to keep moisture out.

12 Claims, 8 Drawing Sheets

FIG. 1A
"PRIOR ART"
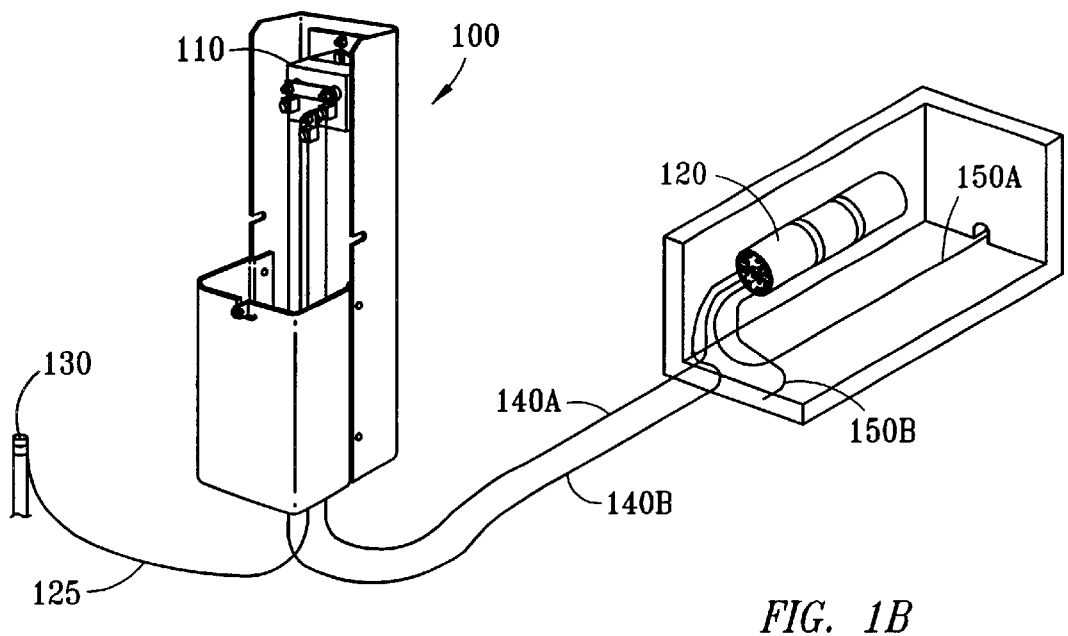
FIG. 1B
"PRIOR ART"
FIG. 1C
"PRIOR ART"
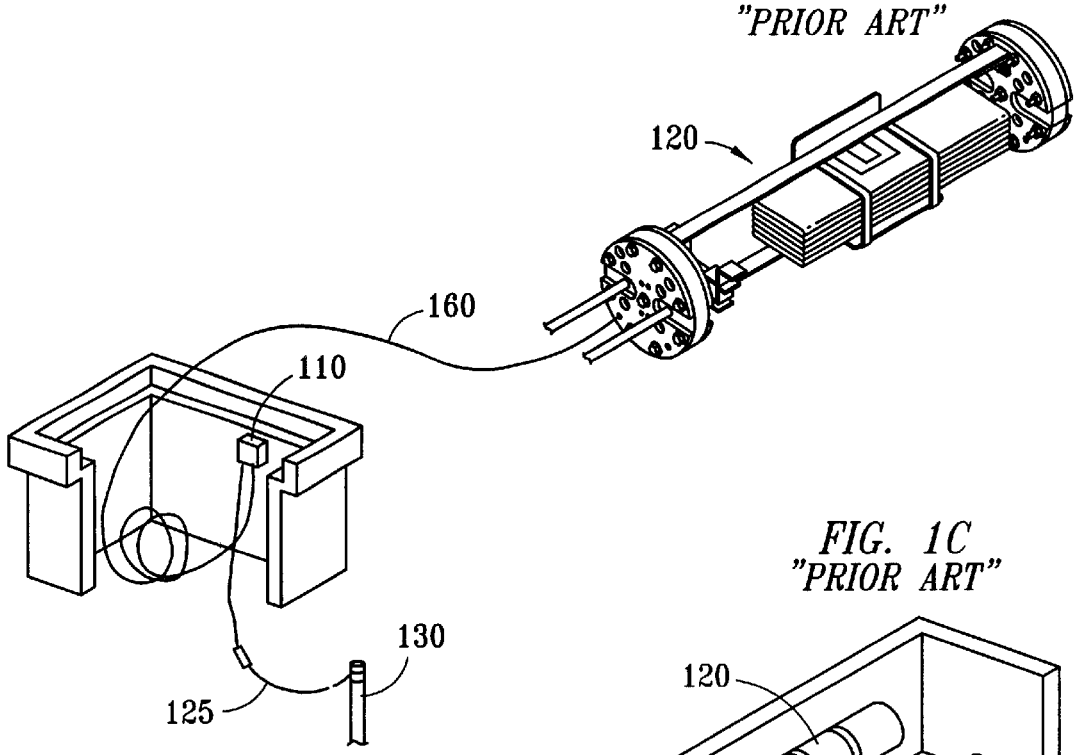

METHOD AND APPARATUS FOR A CABLE LOCATION AND PROTECTION SYSTEM

TECHNICAL FIELD

The present invention relates generally to telecommunication services and more particularly to a method and an apparatus for more effectively utilizing fiber-optic cable splice protector closures.

BACKGROUND OF THE INVENTION

Fiber-optic communications cable systems are becoming widely used in the communications industry because of the increased data throughput capacity. For example, a fiber-optic cable has a throughput capacity that exceeds 40 times that of conventional metallic cables. Accordingly, fiber-optic cables are very desirable for use in densely populated metropolitan areas and for transporting data and information in today's communication age. The use of fiber-optic cables is also advantageous because they are immune from losing information due to random electromagnetic pulses. One reason for this advantage is that fiber-optic cables use light pulses instead of electrical signals to carry information. A disadvantage of using fiber-optic cables, however, is that they are not as readily detected by conventional metal and electrical signal detectors. Thus, cable detection systems may not be used to detect fiber-optic cables. This disadvantage of fiber-optic cables poses a number of risks and maintenance difficulties not posed by metallic cables. For example, fiber-optic cables are relatively vulnerable to the risk of being cut during construction.

It is also often necessary to detect a fiber-optic in order to find detected problems, to carry out repairs and to connect other cables. In general, it is nevertheless imperative to be able to detect cabling for repair, replacement or maintenance to avoid extended disruption of service of any kind and to maintain a high grade and quality of service for both voice and data transmissions.

To enhance or enable detection of fiber-optic cables, fiber-optic cables are often formed within a metallic sheath. Alternatively, a tracer wire is often embedded in the fiber-optic cable bundle. A low frequency electrical signal, known as a tone, is transmitted from a central office down the sheath or tracer wire to enable detection. In order to conduct the tones along the cable, however, the sheath or tracer wire of the fiber-optic cable bundle cannot be directly grounded at any point except at a terminating end. Otherwise, the signal will not travel the entire length of the cable and will render portions of the fiber-optic cable bundle undetectable.

In some communications cable systems, the fiber-optic cable bundle can be as long as 100 miles in length. Such a lengthy cable bundle typically has a large number of "side legs." A side leg is a cable or cable bundle that branches from the main cable bundle and serves a smaller group of users. These side legs often vary in length. As a result, they also vary in impedance. Due to the potential differences in impedance caused by differences in side leg lengths, it is likely that a cable locating tone will propagate at different, and sometimes insufficient strengths, down each side leg. If the tone has insufficient signal strength, radiation of the tone may not propagate to the surface above the buried cable with sufficient strength to be readily detected or detected at all. Accordingly, proper design of tone detection systems is very important.

On occasion, a fiber-optic cable bundle must be strung over and above major roadways and other obstacles. The conductive metallic sheaths or tracer wires are therefore subject to transient electrical surges induced from any number of sources, including lightning. The transient electrical surges on the cable can cause damage to equipment connected to the cable and can also be very dangerous to persons working on, or otherwise coming into contact with the cable. Accordingly, there is a great need to ground the metallic sheath or tracer wire, with respect to transient surges, to minimize danger to people and equipment.

The length of ground cable extending from the fiber-optic cable bundle to ground also presents physical hazards that can easily damage the fiber-optic cable bundle. For example, they can become tangled with an animal, person or moving object, causing undue force to be exerted against the fiber-optic cable bundle to which the ground cable is attached. To illustrate, a person may trip over the wire, thereby exerting a severe tug on the fiber-optic cable bundle. Similarly, the cable can become tangled with a moving vehicle, grass mower blades and the like.

In addition to the dangers from exposed grounding cables, any sudden pulling force can damage the fiber-optic cable closure or the cable bundle, either of which consequence can require disruption of communications services until repaired. Disruption of service typically can cost a communications service provider large amounts of revenue, often exceeding one million dollars per hour. Thus, while it is important to ground a fiber-optic cable sheath, there are many risks involved with doing so.

One problem with merely grounding the metallic sheath or tracer wire, however, is that the grounded wires would also serve to ground and prevent propagation of the tones. Thus, while there is a need to avoid grounding the cable so that tones will conduct along the entire length of the fiber-optic cable bundle, there also is a competing need to consider the safety issues of not grounding a metallic sheath or tracer wire.

One solution that reconciles the competing needs is to install a surge suppressor at the termination site of each customer drop, connected between either the outer sheath or tracer wire of the cable and a ground. The surge suppressor operates as a short circuit to a local ground, for transient signals exceeding a specified threshold. Otherwise, the surge suppressor operates as an open circuit allowing the tones to be conducted down the line. The use of the surge protectors, therefore, offers an elegant solution to most of the problems listed above. Unfortunately, several problems continue to exist.

While surge protectors act as an open circuit to tones as they propagate down the metallic sheath or tracer wire, they typically are secured on or near the cable sheath under the ground level to connect the sheath to a grounding rod. Access to and retrieval of the buried sheath and protector block replacement, for maintenance and the like, are typically gained through a manhole or hand hold. Preferably, the connection between the ground cable and sheath is made within a protective closure which is retrieved as well. The ground cable between the grounding rod and the surge protector varies in length, but is typically at least fifteen feet long, to allow the surge protector and closure to be more conveniently located away from the manhole or hand hole for service. Having long grounding cables is problematic, because increased length increases cable resistance, thereby diminishing grounding effectiveness.

The fiber-optic protective cable closure is a housing device that protects and maintains the integrity of fiber-optic cable splices and connections to the ground cables and the surge protectors. In some systems, the surge protector is placed above ground in a pedestal while the closure is placed below ground in the manhole.

Conventional systems include long grounding cables that connect the surge protector to the sheath. Accordingly, when the surge protector or the protective closure need repair or maintenance, they are removed to a convenient location. Accordingly, a long grounding cable is required so that the grounding cable does not have to be cut and re-attached during the repair or maintenance. Pulling a long grounding cable through the manhole to repair a fiber-optic cable bundle creates an additional step. Moreover, a person repairing the closure or fiber-optic cable bundle will also frequently coil the grounding cable. This is often done to reduce the danger of tripping on the grounding cable or the danger of the grounding cable becoming tangled with a moving object. Thus, having a long grounding cable creates yet another step. Moreover, significantly reducing the length of the grounding cables can save tremendous amounts of money when one considers the cumulative effect of reducing all of the grounding cables even for only one 100-mile fiber-optic cable bundle loop.

Thus, a need therefore exists for an apparatus and method of connecting fiber-optic cable bundle metallic sheaths or tracers wires to a grounding rod with grounding cables that are as short as possible.

Because splices of fiber-optic cables within a protective closure can typically carry millions of dollars worth of communications per hour, damage to the splices can result in a staggering amount of lost business and resulting lost revenues. As a result, defective surge protection systems are often not repaired or maintained, due to a strong desire to minimize inadvertent damage to the splices within the closure. Accordingly, many cable location systems are inoperable, because the tones cannot be effectively transmitted down a fiber-optic cable bundle that has not been properly maintained.

A need therefore exists to reduce the risk of inadvertent damage to the splices within the closure during routine maintenance of fiber-optic cable bundle systems.

A need also exists to facilitate fiber-optic cable bundle maintenance, that increases efficiency and safety, and that reduces costs of labor and materials.

SUMMARY OF THE INVENTION

A typical fiber-optic cable bundle system, according to the present invention, includes a quick disconnect for mechanically disconnecting a closure or surge protector from a ground rod. The quick disconnect is connected in between one or two short grounding cables. One grounding cable is connected to a closure or surge protector and the other is connected to a grounding rod. The grounding cable that connects the quick disconnect to the closure is electrically coupled to one of a metallic sheath or a tracer wire for transmitting tones down the length of the cable bundle.

Including a quick disconnect between the surge protection circuitry and the grounding rod allows the use of relatively short grounding wires. Because a fiber-optic cable bundle can be disconnected from the grounding wire, there is no need to have a long grounding cable for repair or service in a convenient location. Additionally, efficiency is increased in that the grounding cable no longer needs to be pulled and coiled. Material costs are also reduced.

In an alternate embodiment of the invention, the quick disconnect also is placed serially between the surge protection circuitry and the closure. This allows the surge protection circuitry to be separated from the closure. Accordingly, it is less likely that the closure will inadvertently be damaged during the servicing of an ancillary circuit such as the surge protector or filter. This facilitates the maintenance and repair of the fiber-optic cable systems.

Another aspect of the invention is to include the quick disconnects between the surge protection circuitry and other external fiber-optic cable bundle system components. For example, the quick disconnects are, alternatively or in combination, placed serially between the surge protection circuitry and components such as pull blocks, pedestals and water proof enclosures. The inclusion of the quick disconnects between the components of a fiber-optic cable bundle system creates modularity in that the components can readily be separated electrically and mechanically. The use of the quick disconnects protects splicing within the closure when either a component or the surge protection circuitry is serviced or when a component experiences a sudden tugging motion from another source. This modular feature eliminates a risk and disincentive to service fiber-optic cable bundle system components, such as the surge protection circuitry.

In another aspect of the present invention, a new and improved closure allows electrical access to the internal components without opening and potentially damaging the splices or components within a closure. More specifically, external ports create a connection to specified electrical contact points within the closure. In one embodiment, a port is connected to the sheath or tracer wire of the fiber-optic cable bundle. In another embodiment, a port is connected to at least one sensor within the closure wherein the sensor is for monitoring either a vacuum level, a humidity level, a specified voltage level or is any one of other common sensing devices. In yet a third embodiment, a port is connected to circuitry that monitors communication signals being transmitted within the closure.

BRIEF DESCRIPTION OF THE DRAWINGS

A better understanding of the present invention can be obtained when the following detailed description is considered in conjunction with the following drawings, in which:

FIG. 1A is a cutaway view of a conventional fiber-optic cable bundle system in which a surge protector is remote from a closure and generally represents what is termed as a Pedestal Mount Application;

FIG. 1B is a cutaway view of a conventional fiber-optic cable bundle system in which a surge protector is remote from a closure and generally represents what is termed as a Backbone Application;

FIG. 1C is a cutaway view of a manhole containing a fiber-optic closure and a ground wire;

DETAILED DESCRIPTION OF THE DRAWINGS

Figure 2A:
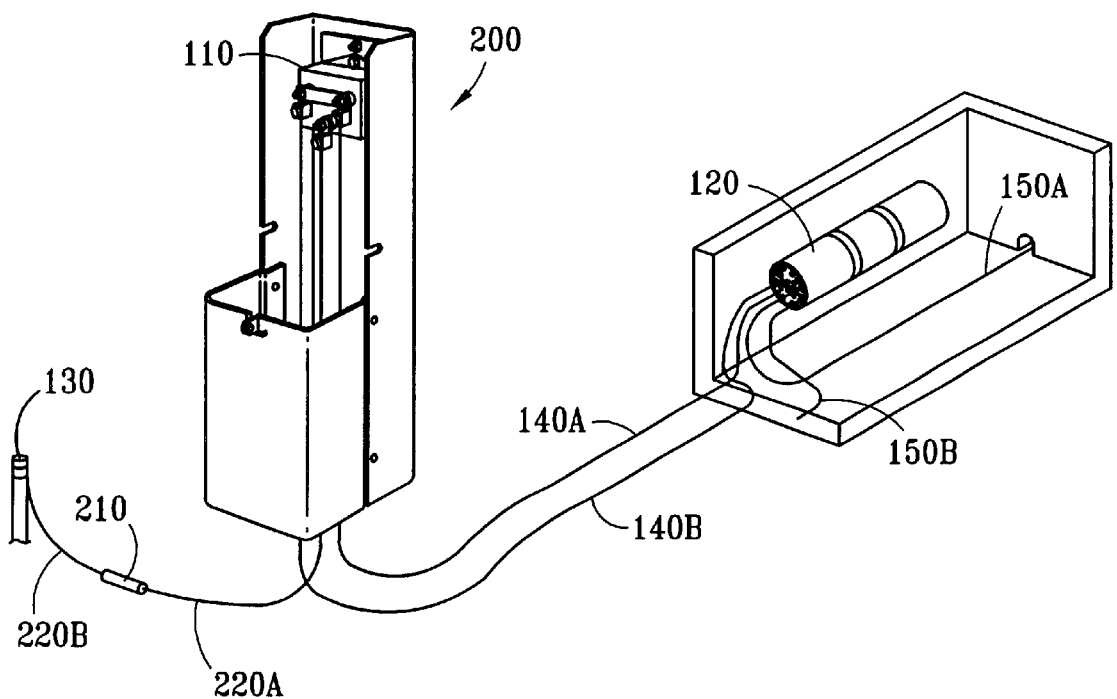
FIG. 2A is a cutaway view of a conventional fiber-optic cable bundle system in which a surge protector is remote from a closure, and generally represents what is termed as a Pedestal Mount Application, according to a first embodiment of the invention.

FIG. 1A is a cutaway view of a conventional fiber-optic cable bundle system in which a surge protector is remote from a closure in a Pedestal Mount Application. A pedestal shown generally at 100 includes a surge protector 110 that is electrically connected to a ground and at least one fiber-optic cable bundle sheath. In general, a pedestal is an above ground structure for allowing access to the surge protector or to a wire coupled to the sheath of the fiber-optic cable bundle. Closure 120 is connected by cable 125 to the ground rod 130 to which transient surges are shorted. Cables 140A and 140B originate from the pedestal 100 and terminate at the closure 120. Within the closure 120, cables 140A and 140B are electrically coupled to at least one of the sheaths of fiber-optic cables 150A and 150B. Coupling fiber-optic sheaths within the closure to outgoing cables is, typically, called a circuit node.

As known by those skilled in the art, a sheath is a metallic cover placed around the outside of a fiber-optic cable and is for carrying "tones" that are used by conventional cable detection systems and devices. The sheath and the fiber-optic cable jointly form the fiber-optic cable bundle. The surge protector 110 is a conventional device that acts as an open circuit to tones transmitted down the sheath and as a short to the ground for transient signals appearing on the sheath that exceed a specified threshold. For example, a transient signal exceeding 150 volts peak may cause a surge protector 110 to create a short to ground.

In one embodiment, the surge protector 110 includes both grounding circuitry and a filter that blocks 60 hertz power signals that are induced onto the metallic sheath from a power line. In different geographic regions having different frequency power signals, of course, a filter adapted to block signals having a frequency of the local power source may be used.

In an alternate embodiment, the surge protector 110 may be replaced solely by a filter, that is, protector 110 does not include circuitry having the surge protection capabilities. The surge protection is provided elsewhere in the system. In the system of FIG. 1A, the closure 120 is buried or located below ground level and accessible through a manhole while the surge protector is located in the pedestal above ground.

Continuing to refer to FIG. 1A, the ground 130 is formed of a metal rod having rugged mechanical properties, allowing it to be easily driven into the ground without damage. The requirements for a ground rod 130 include that it provide a low impedance path to ground, that it withstand and dissipate repeated surge currents, and that it provide corrosion resistance to various chemicals in the soil for the life of the equipment being protected by the ground. For example, in a corrosive soil, a copper bonded ground rod may be used.

The ground 130 is typically connected to the grounding cable with an exothermic weld. Alternatively, a compression connector may be used. An exothermic weld is preferred since it resists the tendency of resistance to build up at the connection. For example, use of clamps and connectors typically results in resistive corrosion being formed between the connector and the ground rod thereby increasing the impedance to ground. A typical impedance of the grounding rod should be 25 Ohms or less. In the system of FIG. 1A, a typical length of cable 125 connecting the surge protector 110 to the ground rod 130 is at least fifteen feet.

FIG. 1B is a cutaway view of a conventional fiber-optic cable bundle system in which a surge protector 110 is remote from a closure 120 in a Backbone Application. A backbone application is one in which the fiber-optic closure is located on the main fiber cable and is used to transport telecommunication signals between two designated points. A cable 160 connects the surge protector 110 to the closure 120 (shown without a housing case/cover for illustrative purposes). Cable 160 is long enough to require coiling when the closure 120 is close to the surge protector 110. Cable 160 is typically at least fifteen feet long. This length allows a technician to remove the surge protector 110 or the closure 120 from a manhole or hand hold and to carry it to a service vehicle or other convenient place for servicing.

The embodiments of FIGS. 1A and 1B illustrate a surge protector 110 that includes the surge protection circuitry as well filter circuitry for filtering power signals induced onto the fiber-optic cable sheath or tracer wire. Alternatively, the surge protector 110 may be replaced solely by a filter or a cable monitoring device or a combination thereof. Each of these combinations is contemplated by reference to protector 110.

FIG. 1C is a top view of a manhole illustrating a fiber-optic closure 120, a coiled ground wire 125 and a ground rod 130. As may be seen, the ground wire 125 is sufficiently long to require coiling when placed within the manhole. As explained previously, the ground wire 125 is typically at least fifteen feet long so that the closure 120 may be removed from the manhole for servicing at a convenient location.

FIG. 2A is a cutaway view of a conventional fiber-optic cable bundle system in which a surge protector is remote from a closure in a Pedestal Mount Application according to a preferred embodiment of the invention. The surge protector 110 is electrically connected to the sheaths of fiber-optic cables 150A and 150B within the closure 120 via lines 140A and 140B. Additionally, the surge protector 110 is connected to a quick disconnect 210 via grounding cable 220A. The quick disconnect 210 also is connected to the ground 130 via grounding cable 220B. The quick disconnect 210 is formed of a standard quick disconnect that is operable to carry large transient currents that may result from a lightning strike or from another source. The quick disconnect 210 is formed to be water resistant to minimize the likelihood of corrosion occurring and preventing proper operation of the quick disconnect. A water resistant quick disconnect also keeps the cables from shorting to earth ground. These aspects are important since the quick disconnect will frequently be placed in a humid location below ground level. A dielectric or medalist grease can be initially placed upon the contacts of the quick disconnect to further prevent corrosion and to facilitate the quick disconnection whenever a pulling force is exerted upon the quick disconnect 210. One quick disconnect that may be used is referenced as part number "#6LITEQBD" as sold by Lite Industry. In operation, the quick disconnect 210 may be separated at will. This allows the use of much shorter grounding cables, comparing cables 220A and 220B with cable 125 connecting the surge protector 110 to the ground rod 130 because the quick disconnect 210 may be separated whenever the surge protector 110 and the closure 120 must be removed from proximate positions relative to each other. Thereafter, the quick disconnect 210 may be reconnected once the surge protector 110 and the closure 120 are placed back into proximate positions relative to each other. In each of the preferred embodiments of the invention, the quick disconnect 210 is connected to the grounding cable between the surge protector 110 and grounding rod 130.

Figure 2B:
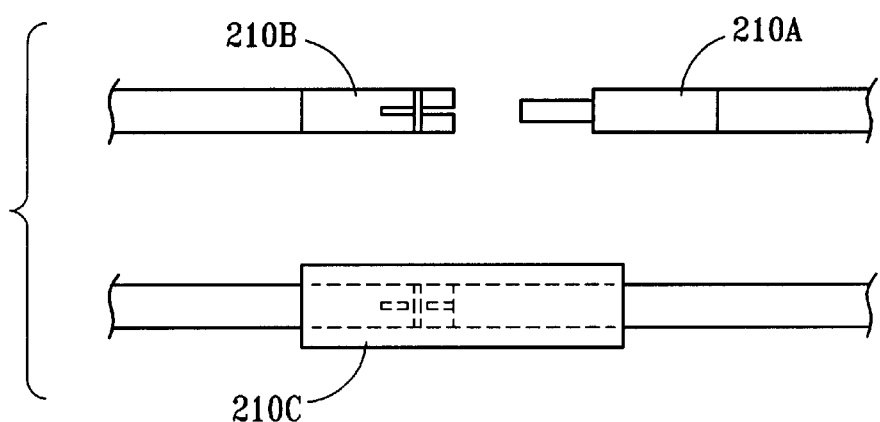
FIG. 2B illustrates a quick disconnect used in the various embodiments of the invention.

FIG. 2B is an exploded view illustrating a quick disconnect used in the various embodiments of the invention. The quick disconnect 210 includes a first portion 210A that is for engaging with a second portion 210B. Additionally, as may be seen, a cover 210C is smilingly formed over first and second portions 210A and 210B to prevent moisture from accumulating at the connection of first and second portions 210A and 210B. Also, while not explicitly shown in FIG. 2B, a conductive grease is placed within the cover 210C to further prevent moisture from accumulating at the connection of 210A and 210B.

Figure 3:
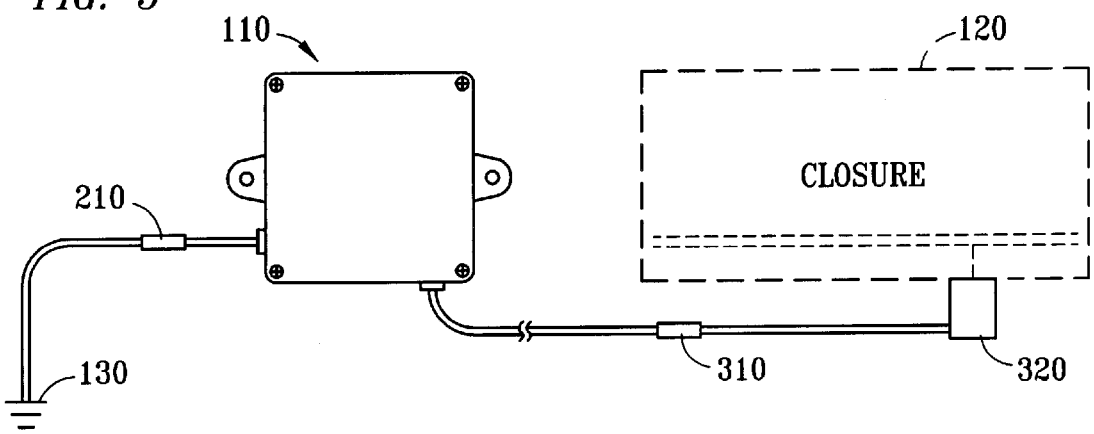
FIG. 3 is a schematic diagram illustrating a second embodiment of the invention.

FIG. 3 is a schematic diagram illustrating a second preferred embodiment of the invention. As may be seen in FIG. 3, the surge protector 10 is remote from the closure 120 and is connected to the ground 130 through the quick disconnect 210. Additionally, the surge protector 110 is connected to the waterproof connector 320 through the quick disconnect 310. The quick disconnect 310 is similar to the quick disconnect 210. The waterproof connector 320 is formed to extend from the surface of the closure 120 to create an electrical path to a circuit component within the closure 120. By way of example, the waterproof connector 320 is connected to the sheath (not shown) of the fiber-optic cable bundle. With these quick disconnects 210 and 310, the surge protector 110 can be disconnected and removed from the closure 120 and ground 130 without moving the closure 120 and without having to pull and coil a long ground cable.

The surge protector 110 may be disconnected from the closure 120 by disconnecting the waterproof connector 320. The quick disconnect 310, however, allows for the surge protector 110 to be disconnected by a forceful tugging action on the cable connecting the surge protector 110 to the closure 120. The result is to protect the fiber-optic splices within the closure 120. The risk of damaging the closure 120 is reduced, therefore, by the quick disconnects 210 and 310.

In operation, a transient signal of a specified magnitude appearing on the metallic sheath is transmitted through the waterproof connector 320, the quick disconnect 310, into the surge protector 110, through the quick disconnect 210 and down to the ground 130. The embodiment of FIG. 3 allows a technician to remove either the surge protector 110 or the closure 120 without disturbing the other when only one of the two requires servicing.

In the described embodiment of the invention, the waterproof connector 320 is coupled to the fiber-optic cable sheath. Alternatively, it may also be connected to sensing equipment (not shown) within the closure 120. By way of example, the waterproof connector 320 of FIG. 3 may be connected either to a voltage or humidity monitoring sensor.

Similarly, the waterproof connector 320 may be coupled to signal measuring circuitry within the closure.

In another embodiment of the invention, the closure 120 includes a plurality of the waterproof connectors 320, each coupled to different sensors or circuit elements. The inventive closure 120 is, in general, operable to provide electrical access (commonly called an "output port") to circuitry within the closure without requiring one to open or handle the closure. The inventive closure supports maintenance activities while minimizing risk of damage to the fiber-optic splices within the closure.

Figure 4:
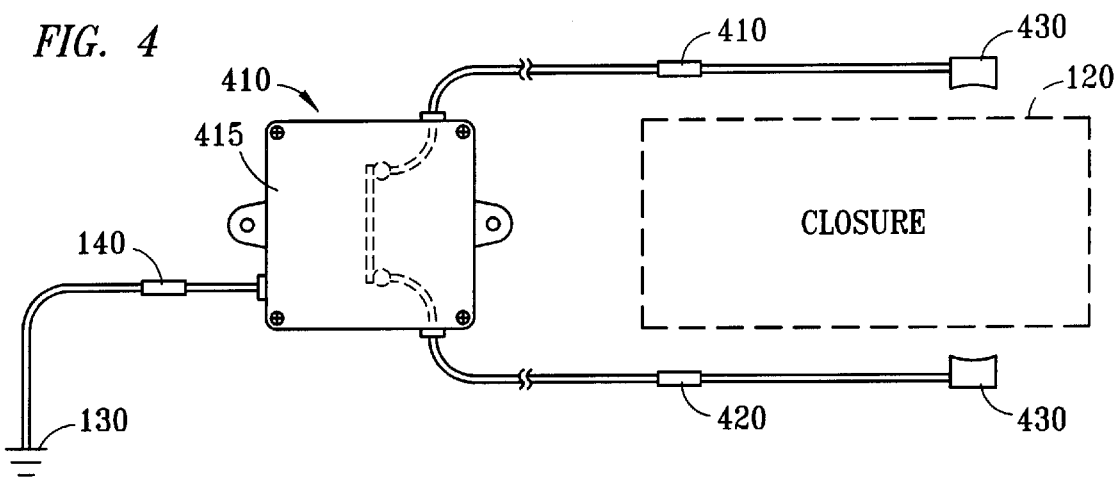
FIG. 4 is a schematic diagram illustrating a third embodiment of the invention.

FIG. 4 is a schematic diagram illustrating a third embodiment of the invention. The fiber-optic cable bundle system includes a surge protector 10 that is remote from the closure 120. As may be seen, the surge protector 10 is connected to the ground 130 through the quick disconnect 210. The surge protector 110 also is electrically coupled to the closure 120 by way of the quick disconnects 410 and the waterproof connectors 420. As may be seen, the system of FIG. 4 includes two lines having the quick disconnects to couple the surge protector 110 to a plurality of sheaths of the fiber-optic cable bundle within the closure 120. In contrast, the system of FIG. 3 includes only one line and one quick disconnect 310. As will be understood by those skilled in the art, a closure 120 frequently serves to connect at least two fiber-optic cables, each having a sheath or tracer wire. Accordingly, in a two-wire system as shown in FIG. 4, one wire is frequently known as the "East" wire while the other is known as the "West" wire. The sheaths of the East and West wires are connected electrically at the surge protector (or filter or enclosure) in an electrically separable manner to allow isolation so that breaks in a line may be detected.

More specifically, the surge protector 110 includes a removable waterproof lid 415 to give electrical access to the sheath. In addition, the east and west lines are connected by a removable jumper as is known by those skilled in the art. The approximate location of a break in the line may be determined by removing the jumper and testing the line. A technician can test the line by transmitting tones down isolated portions of the fiber-optic cable network to determine whether an isolated portion has a break or not. This embodiment also supports maintenance efforts without requiring a technician to handle or open the closure 120. Again, this reduces the risk of damage to the closure 120 and encourages proper maintenance of the surge protection equipment.

In operation, transient signals of a specified magnitude are transmitted through the waterproof connectors 420, the quick disconnects 410, into the surge protector 110, through the quick disconnect 210, and down to the ground 130. As with the system of FIG. 3, only the surge protector 110 or the closure 120 need be handled during maintenance thereby minimizing risk of damage to the other.

Figure 5:
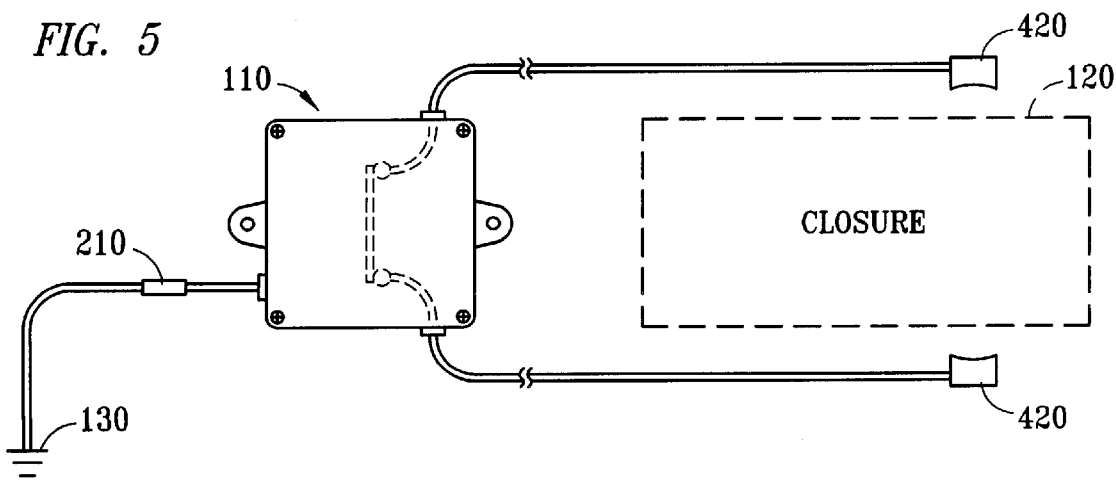
FIG. 5 is a schematic diagram illustrating a fourth embodiment of the invention.

FIG. 5 is a schematic diagram illustrating a fourth embodiment of the invention.

The surge protector 110 is remote from the closure 120 and is connected to the ground 130 through the quick disconnect 210. Additionally, the surge protector 110 also is coupled to the closure 120 by way of the waterproof connectors 420. One difference here, however, is that the surge protector 110 is not connected to the waterproof connectors 420 by way of the quick disconnects 410 (of FIG.

4). The system of FIG. 5 further includes the surge protector 110 having a removable waterproof cover 415 for allowing electrical access to the sheath.

Figure 6A:
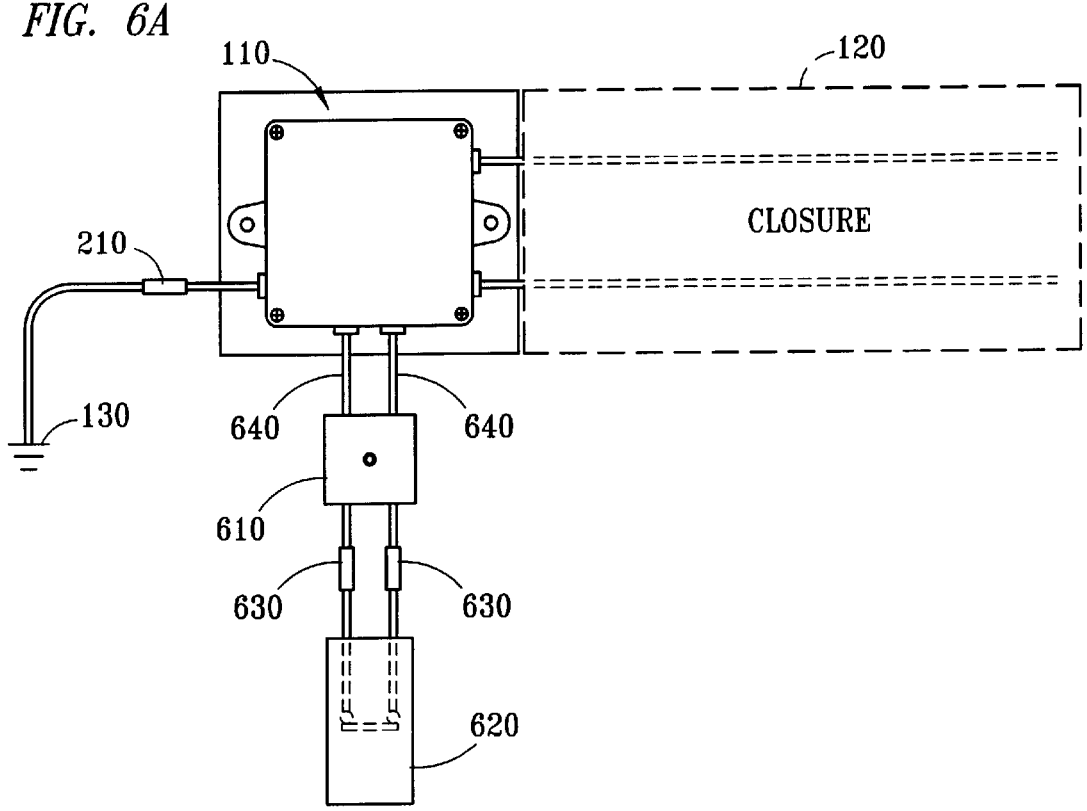
FIG. 6A is a schematic diagram illustrating a fifth embodiment of the invention.

FIG. 6A is a schematic diagram illustrating a fifth embodiment of the invention. As may be seen, the surge protector 110 is integrally formed with the closure 120. The surge protector 110 is coupled to the metallic sheath or tracer wire of the fiber-optic cable bundle through an internal connection within the closure 120. As with the previous embodiments, the surge protector 110 is connected to the ground 130 through the quick disconnect 210. Additionally, the surge protector 110 is connected to a pull block 610 which, in turn, is connected to a pedestal 620 through a pair of the quick disconnects 630. A pull block is a mechanical structure designed to hold either one of a plurality of cables in place and to prevent a sudden force on the cabling from damaging the closure 120 (or other device). Typically, the pull block 610 and the closure 120 are placed within a man hole or a handhold, either of which forms an aperture through which the cabling connecting the closure to the surge protector 110 is routed. The pull block 610 is larger than the aperture in the man hole/handhold. As a result, a sudden force does not rip the cabling out of the closure unless the force is sufficient to rip the pull block through the aperture of the man hole or handhold. With the quick disconnects, however, the quick disconnects 630 will separate before the pull block is ripped through the aperture. Accordingly, the splicing within the closure is not damaged.

The pedestal 620 is similar to the pedestal of FIGS. 1A and 1B. In the embodiment of FIG. 6, the pedestal 620 includes an enclosure for allowing access to the cabling connected to the sheath or tracer wire. Typically, the enclosure includes a removable plate that can be removed to allow access to or to isolatate a portion of the sheath/tracer wire. As discussed before, placement of such enclosures within the pedestal 620 facilitates trouble shooting without requiring one to handle the closure 120.

On the other hand, a problem of using such a pedestal is the danger posed by vehicles or equipment that may accidently impact the pedestal thereby jerking the cabling connected to the closure 120 that is within the man hole or hand hold. Without the pull blocks and the quick disconnects of FIG. 6, such an event can serve to damage the closure and, potentially, to sever the fiber-optic splices within the closure 120. Accordingly, the embodiment shown herein in FIG. 6 includes the quick disconnects 630 in the event that the pull block is pulled prior to the pedestal being unearthed.

In operation, if a pedestal 620 is hit and moved by a vehicle or piece of equipment, the quick disconnects 630 will separate once the pull block has been forced against the aperture of the man hole/handhold and can no longer be displaced. Accordingly, the combination of the pull block 610 and the quick disconnects 630 operate to detach the closure 120 from the pedestal 620 in a manner that protects the closure 120. As before, electrical surges are dissipated to the ground 130 through the quick disconnect 210. In the event that the closure 120 of FIG. 6 requires maintenance, the quick disconnects 630 and 210 may be disconnected to allow the technician to remove the closure 120 from the man hole for servicing. Accordingly, the combination of the quick disconnects 210 and 630 allow the fiber-optic cable bundle system to be modular in nature wherein only desired elements need to be moved for servicing without requiring the movement and coiling of large amounts cabling.

Figure 6B:
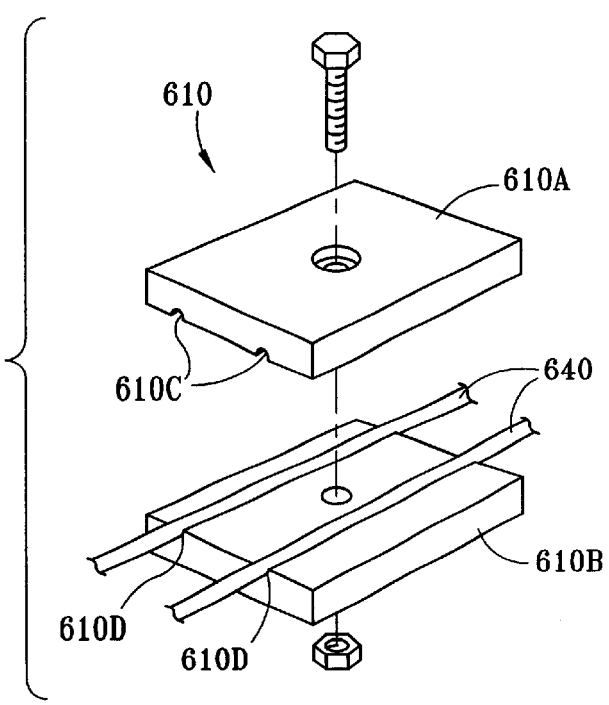
FIG. 6B is an exploded view illustrating a pull block used in various embodiments of the invention.

FIG. 6B is an exploded view illustrating a pull block used in various embodiments of the invention. As may be seen, a pullblock 610 includes an upper block 610A and a lower block 610B. Upper block 610A forms at least one channel 610C and lower block 610B forms at least one channel 610D. Channels 610C and 610D are for receiving a cable and for securely attaching upper and lower blocks 610A and 610B, respectively, to the cable whenever upper and lower blocks 610A and 610B are attached to each other. While upper and lower blocks 610A and 610B may be attached to each other in many known ways, they are attached to each other by nut and bolt in the preferred embodiment of the invention. Other ways include by screw or clamp.

Figure 7:
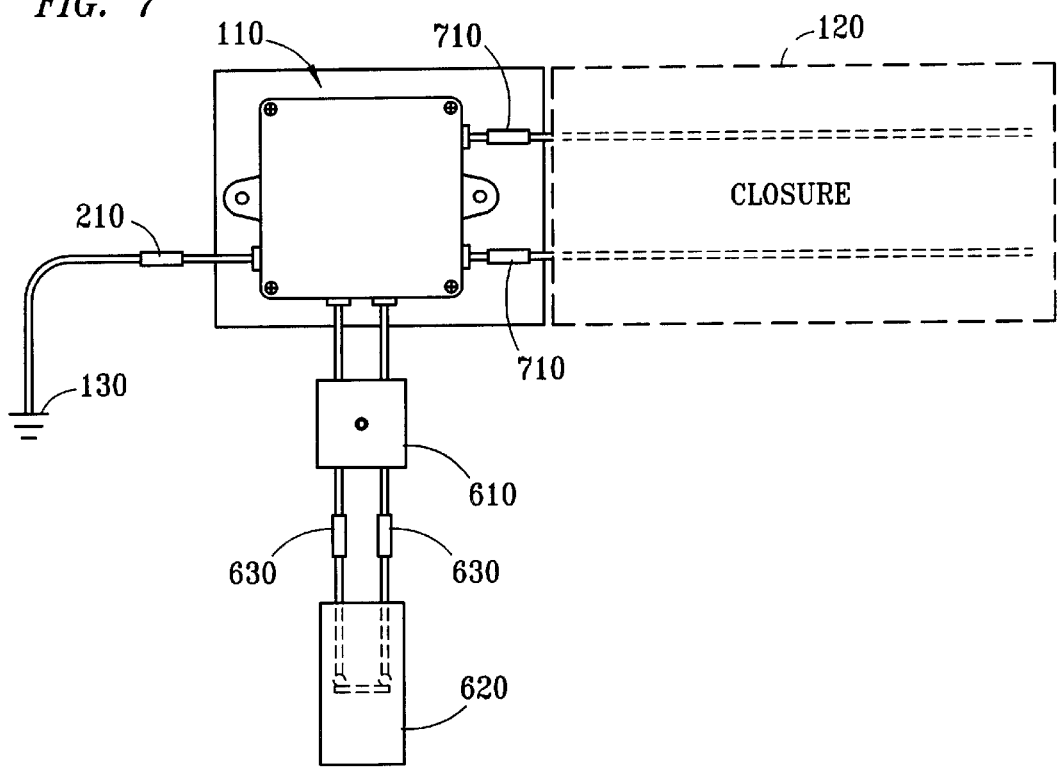
FIG. 7 is a schematic diagram illustrating a sixth embodiment of the invention.

FIG. 7 is a schematic diagram illustrating a sixth embodiment of the invention. A surge protector 110 is integrally formed with the closure 120 and is similar to the embodiment of FIG. 6. Additionally, the embodiment of the FIG. 7 includes a pair of the quick disconnects 710 between the surge protector 110 and the closure 120. In this embodiment, the surge protector 110 is integrally formed and attached to the closure 120. It also, however, is formed to be detachable. Accordingly, the quick disconnects 710 allow the surge protector 110 to be detached from the metallic sheath or tracer wire of the fiber-optic cable bundle.

In operation, a transient signal having a specified voltage level appearing on metallic sheath or tracer wire would be transmitted from the sheath, through the quick disconnect 710 into the surge protector 110, through the quick disconnect 210, and down to the ground 130. During servicing, the closure 120 may be detached from the surge protector 110 to prevent unnecessary handling. Moreover, the quick disconnects 710 allow one to electrically isolate the closure while either it or the surge protector 110 is being serviced.

Figure 8:
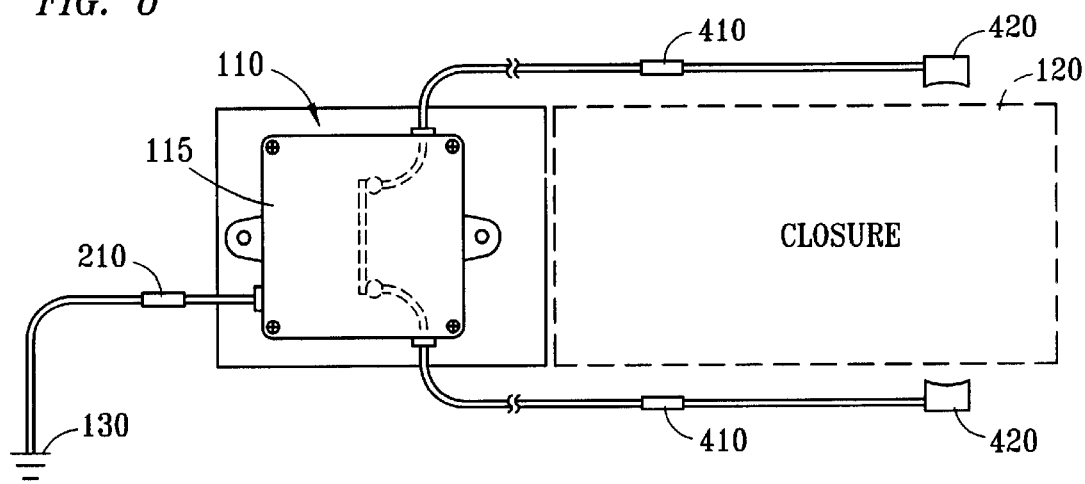
FIG. 8 is a schematic diagram illustrating a seventh embodiment of the invention.

FIG. 8 is a schematic diagram illustrating a seventh embodiment of the invention. A surge protector 110 is integrally attached to the closure 120 and also is coupled to the metallic sheath or tracer wire of the fiber-optic cable bundle through the quick disconnects 410 and the waterproof connectors 420. Additionally, the surge protector 110 is connected to a quick disconnect 210 which, in turn, is connected to the ground 130.

In operation, a transient signal of a specified voltage level on the sheath or tracer wire would propagate through water proof connector 420 and into the surge protector 110. Because the signal is of a specified voltage level, the surge protector 110 creates a short to ground to dissipate the induced signal. Additionally, if some equipment were to snag or pull the cable connecting the fiber-optic bundle to ground, the quick disconnect 210 is operable to separate thereby precluding damage to the fiber-optic cable bundle.

Figure 9:
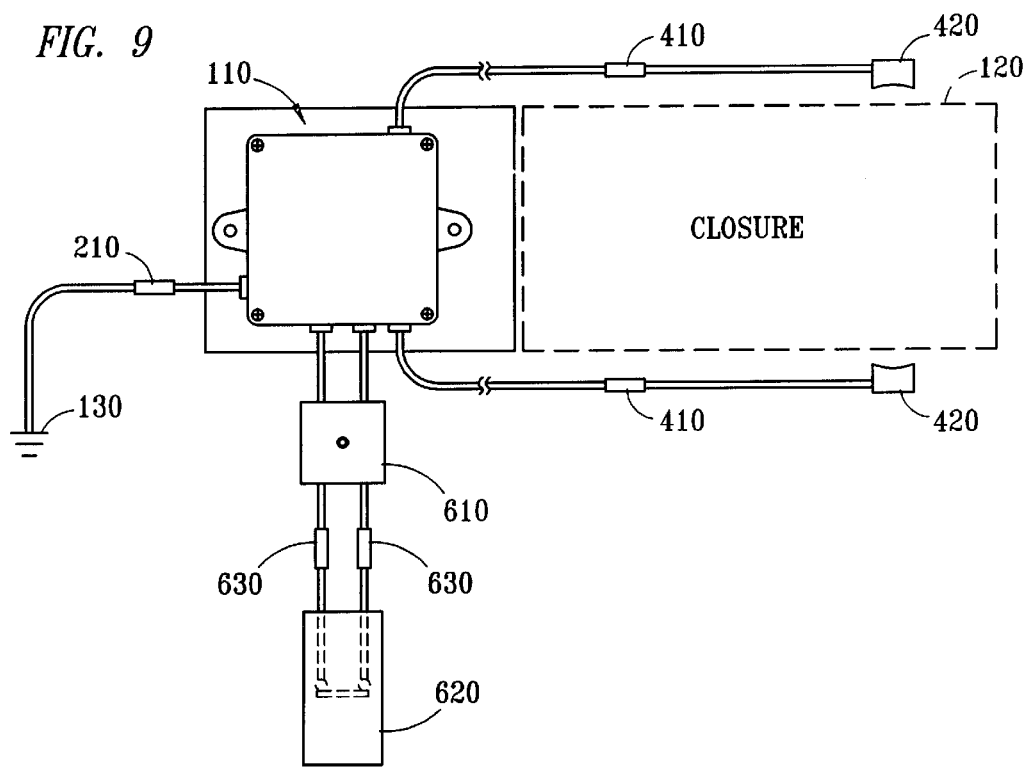
FIG. 9 is a schematic diagram illustrating an eighth embodiment of the invention.

FIG. 9 is a schematic diagram illustrating an eighth embodiment of the invention. A surge protector 110 is integrally formed with the closure 120 and is similar to the embodiment of FIG. 6. The system of FIG. 9 includes the pull block 610, the pedestal 620 and the quick disconnects 630 of FIG. 6. Similar to the embodiment of FIG. 4, the embodiment of FIG. 9 also includes a pair of the quick disconnects 910 between the surge protector 110 and the closure 120. In this embodiment, the surge protector 110 also is integrally formed and attached to the closure 120. It also is formed to be electrically detachable. Accordingly, the quick disconnects 910 allow the surge protector 110 to be detached from the metallic sheath or tracer wire of the fiber-optic cable bundle. In comparison to FIG. 7, however, the surge protector 110 is connected to the closure 120 through external wiring instead of internal wiring. Additionally, the wiring is connected to the sheath within the closure 120 though water proof connectors 420.

In operation, a transient signal having a specified voltage level appearing on metallic sheath or tracer wire would be transmitted through into the surge protector 110, through the quick disconnect 210, and down to ground 130. During servicing, the closure 120 may be electrically isolated from the surge protector 110 to further reduce the likelihood of damage. Moreover, the inclusion of the quick disconnects 410 allows one to electrically isolate the closure while either it or the surge protector 110 is being serviced.

Figure 10:
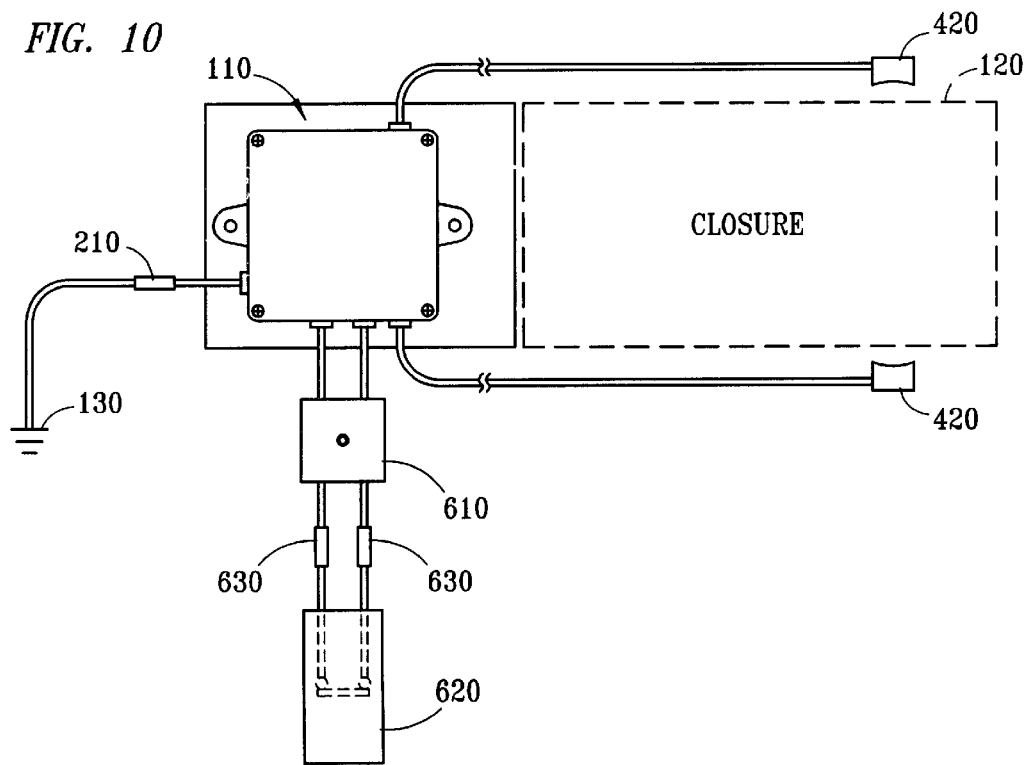
FIG. 10 is a schematic diagram illustrating a ninth embodiment of the invention.

FIG. 10 is a schematic diagram illustrating a ninth embodiment of the invention. A surge protector 110 is integrally formed with the closure 120 and includes the pull block 610, the pedestal 620 and the quick disconnects 630 similar to the embodiment of FIG. 6. The embodiment of FIG. 10 does not include a pair of the quick disconnects between the surge protector 110 and the closure 120 in comparison to other embodiments. It does include, however, the quick disconnect 210 between the surge protector 110 and ground 130. The closure 110 includes an East and a West wire that are coupled to the sheaths (or tracer wires) of the East and West fiber-optic cables through the waterproof connectors 420.

In operation, like other embodiments, a surge of a specified threshold is grounded by the surge protector 110 to the ground 130 through the quick disconnects 210. Additionally, the quick disconnects 630 serve to separate the pedestal from the closure 120 and the surge protector 10 in the event of a sudden tugging motion, such as, the pedestal being hit by an automobile.

Figure 11:
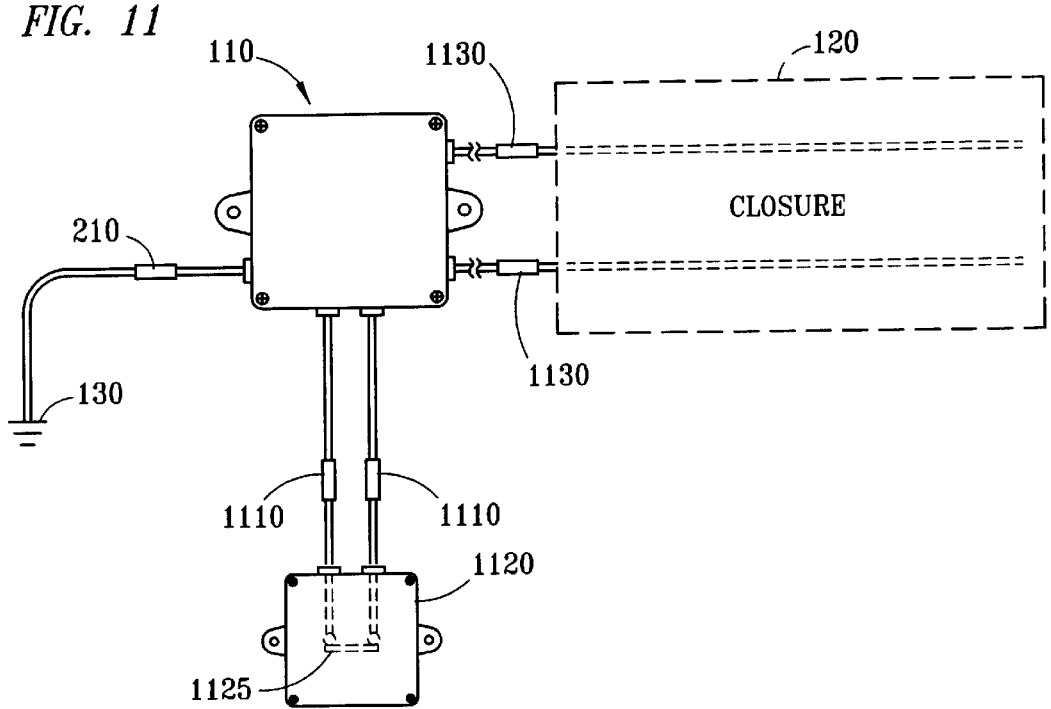
FIG. 11 is a schematic diagram illustrating a tenth embodiment of the invention.

FIG. 11 is a schematic diagram illustrating a tenth embodiment of the invention. The surge protector 110 is formed separately from the closure 120 and includes a pair of the quick disconnects 1110 that are used on the East and West wires emerging from the surge protector 110 going to the waterproof enclosure 1120. In function, the waterproof enclosure 1120 is similar to a pedestal. It is designed, however, to be placed underneath the ground, perhaps in a man hole or a handhold. In general, the waterproof enclosure 1120 includes a removable but watertight lid 1125 to allow for the separation or the connection of the East and West cable sheaths. As described with respect to other similar embodiments, breaking the connection between the East and West sheaths isolates the cable and allows one to find a break in a line. The embodiment of FIG. 11 includes a pair of the quick disconnects 1130 between the surge protector 110 and closure 120. This allows the surge protector to be electrically and mechanically detached from the closure.

Figure 12:
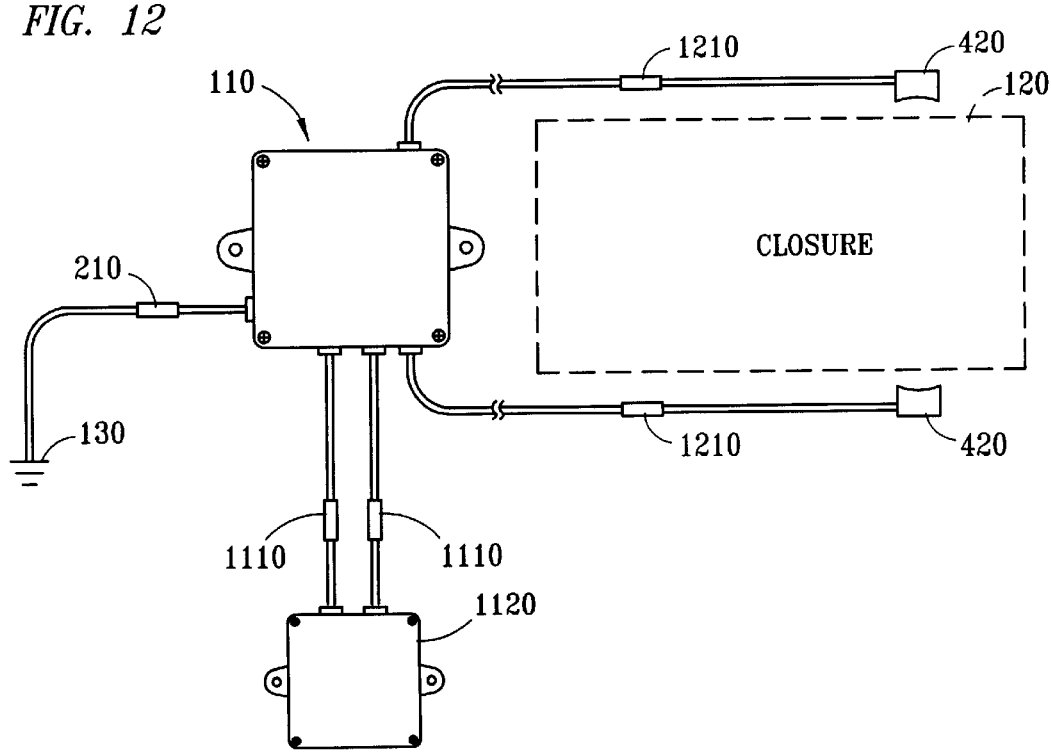
FIG. 12 is a schematic diagram illustrating an eleventh embodiment of the invention.

FIG. 12 is a schematic diagram illustrating an eleventh embodiment of the invention. A surge protector 10 is formed separately from the closure 120 and includes a pair of the quick disconnects 1110 that are used on the East and West wires emerging from the surge protector 110 going to the waterproof enclosure 1120 similar to the embodiment illustrated in FIG. 11. Additionally, the embodiment of FIG. 12 includes a pair of East and West cables that connect the surge protector 110 to a pair of the quick disconnects 1210 that, in turn, are connected to a pair of the waterproof connectors 420. As described elsewhere, the waterproof connectors 420 serve to connect the East and Wire wires to the sheaths for the East and West fiber-optic cables.

Figure 13:
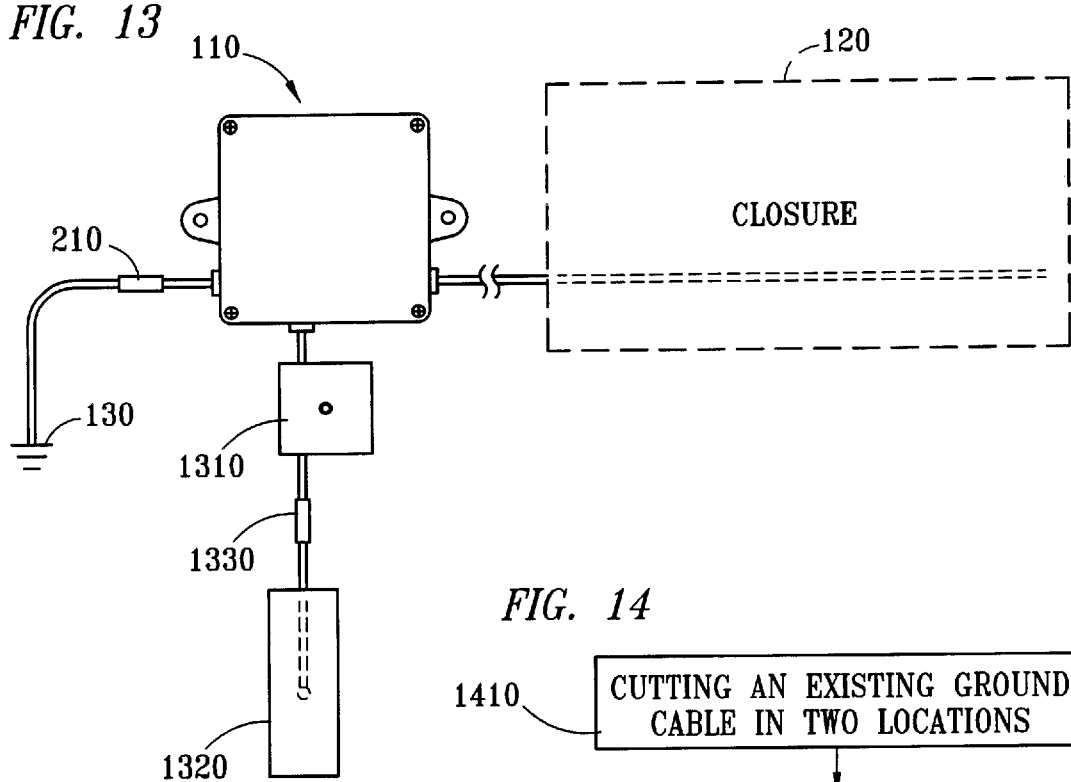
FIG. 13 is a schematic diagram illustrating a twelfth embodiment of the invention.

FIG. 13 is a schematic diagram illustrating a twelfth embodiment of the invention. A surge protector 110 is formed separately from the closure 120 and is coupled to the metallic sheath or tracer wire of the fiber-optic cable bundle through an internal connection within the closure 120. As with the previous embodiments, the surge protector 110 is connected to the ground 130 through the quick disconnect 210. Additionally, the surge protector 110 is connected to a the pull block 1310 which, in turn, is connected to a pedestal 1320 through a quick disconnect 1330. In the embodiment of FIG. 13, the pedestal 1320 includes an enclosure for allowing access to the cabling connected to one of the East or West sheaths or tracer wires.

As may be seen, because only one wire is being routed from the sheath or tracer wire to the surge protector and to the pedestal, the embodiment of FIG. 13 only allows access on one wire. Commonly, the embodiment FIG. 13 will frequently be used either at an originating or terminating end of a fiber-optic cable bundle.

In operation, if a pedestal 1320 is hit and moved by a vehicle or piece of equipment, the quick disconnect 1330 will separate once the pull block has been forced against the aperture of the man hole/handhold and can no longer be displaced. Accordingly, the combination of the pull block 1310 and the quick disconnect 1330 operate to detach the closure 120 from the pedestal in a manner that protects the closure 120. As before, electrical surges are dissipated to ground through the quick disconnect 210. In the event that the closure 120 of FIG. 13 requires maintenance, the quick disconnects 1330 and 210 may be disconnected to allow the technician to remove the closure from the man hole/hand hold for servicing. Accordingly, the combination of the quick disconnects 210 and 1330 allow the fiber-optic cable bundle system to be modular in nature wherein only desired elements need to be moved for servicing without requiring the movement and coiling of large amounts cabling.

Figure 14:
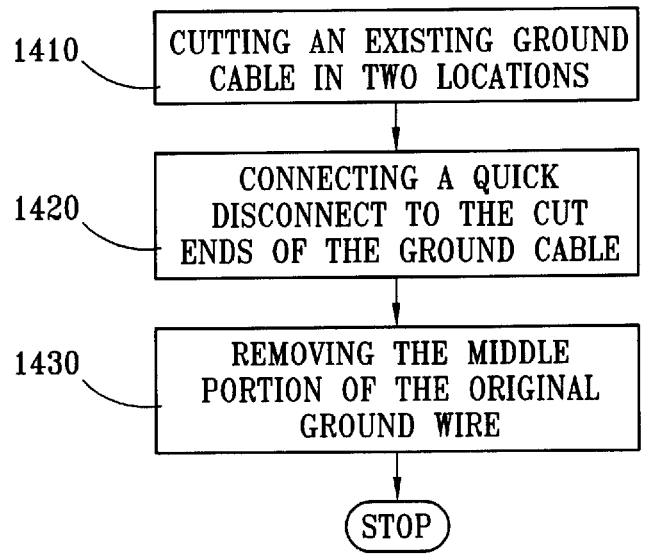
FIG. 14 is a flow chart illustrating a method of manufacturing an embodiment of the invention.

FIG. 14 is a flow chart illustrating a method of the present invention, the method including steps for integrating at least one quick disconnect into a fiber-optic cable network and for shortening at least one grounding cable. The method includes replacing one grounding cable 125 with two grounding cables 220A and 220B. The combined length of cables 220A and 220B are much shorter that the length of cable 125. More specifically, the method includes the step of cutting an existing cable 125 in two locations to form grounding cables 220A and 220B (step 1410). Additionally, a quick disconnect 210 is connected to an end of each of the cables 220A and 220B wherein the cables 220A and 220B become electrically coupled whenever the quick disconnect 210 is connected (step 1420). The end of cable 220B that is not connected to the quick disconnect 210 is connected to the ground 130. The end of the cable 220A that is not connected to the quick disconnect 210 is connected to the surge protector 210. The middle portion of the original cable 125 is then removed and is either recycled or discarded (step 1430). An advantage of this embodiment is that the ground rod 130 does not have to be replaced or reconnected to the cable 220B and the surge protector 110 does not have to be reconnected to the cable 220A. Instead, each unconnected end of the cables 220A and 220B are connected to the quick disconnect 210.

Figure 15:
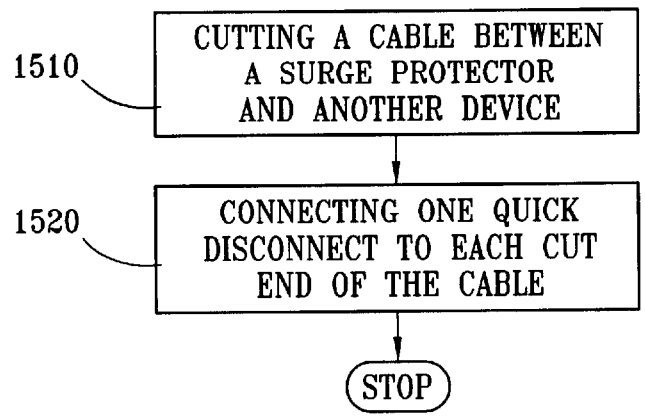
FIG. 15 is a flow chart illustrating a method of manufacturing an embodiment of the invention.

FIG. 15 is a flow chart illustrating a second embodiment of an inventive method. The inventive method includes cutting cabling between the surge protector 110 and another device such as the closure 120 (step 1510) and connecting a quick disconnect, similar to the quick disconnects 210, 310, etc., to each of the cut ends of the cable (step 1520). Similarly, other aspects of the invention include placing the quick disconnects in a similar manner between the surge protector and the pull block 610 or the waterproof enclosure 1120. Similarly, placing the quick disconnects between a pull block 610 and a pedestal 620 or a waterproof enclosure 1320 in an existing fiber-optic cable system is included herein as additional aspects of the inventive method.

While the invention is susceptible to various modifications and alternative forms, specific embodiments thereof have been shown by way of example in the drawings and detailed description. It should be understood, however, that the drawings and detailed description thereto are not intended to limit the invention to the particular form disclosed, but on the contrary, the invention is to cover all modifications, equivalents and alternatives falling within the spirit and scope of the present invention as defined by the claims. By way of example, the embodiments herein included combinations of single wire and dual (East and West) wire systems. Some of these systems include an external device such as a filter, a surge protector, an enclosure, or monitoring equipment or a combination thereof in the plurality wire systems. Moreover, the systems disclosed further included wire systems that are connected directly (internally) to the closure and systems that are connected externally through a water proof connector.

Finally, each of the different types of connections and combinations listed above include the use of the quick disconnects in a plurality of combinations in terms of where they were placed within the system. Some described embodiments included a minimal number of the quick disconnects to merely allow a closure or the surge protector to be serviced without having to have a long ground wire. Other described embodiments included the quick disconnects between the surge protector (or filter, enclosure, etc.) and ground as well as the closure. In yet other described embodiments, the quick disconnects were also used between the pedestal or the waterproof enclosure and one of a pull block or the surge protector (or filter, enclosure, etc.). For example, the invention herein includes using a quick disconnect between ground and any telecommunication device being grounded. For example, the invention specifically includes a system comprising a quick disconnect between a closure and a ground. In another embodiment, the device comprises a closure with at least one of a filter or a surge protector.

As may be seen, the permutations of the various combinations of the teachings herein are numerous. Each of the combinations shown herein as well as other combinations not specifically shown but that can be formed by combining individual elements shown herein this application is specifically included as a part of the disclosed invention whether or not specifically claimed herein.

What is claimed is:

1. A fiber-optic closure for connecting a plurality of fiber-optic cables, at least one of which includes one of a metallic sheath or tracer wire, the closure comprising:
    connectors for connecting fiber-optic strands; and
    an output port for connecting an external device or circuit component to an internal circuit element within the closure whereby signals from said internal circuit element may be monitored without opening the closure to gain access to the internal circuit element; and
    a quick connect interposed between said output port and said external device or circuit.

2. The fiber-optic closure of claim 1 wherein the output port is connected to the one of the sheath or tracer wire whereby electrical access to the sheath or tracer wire may be had without opening the closure.

3. The fiber-optic closure of claim 1 wherein the output port is connected to a sensing device whereby conditions internal to the closure may be monitored without requiring the opening of the closure.

4. The fiber-optic closure of claim 1 wherein the output port is connected to a monitoring device whereby the monitoring device is internal to the closure and whereby the monitoring device outputs signals through the output port.

5. A method for retrofitting a fiber-optic grounding network to include at least one quick disconnect, the method comprising:
    cutting a cable between a first device and a second device to create a first and a second cable wherein the first cable is connected to the first device and the second cable is connected to a second device, wherein at least one of the devices is within an optical fiber splice enclosure; and
    disconnect a quick connect between the first and second cable.

6. A method for retrofitting a fiber-optic grounding network to include at least one quick disconnect, the method comprising:
    cutting a cable between a first device and a second device in two locations to create a first, a middle and a second piece of cable, wherein the first cable is connected to the first device and the second cable is connected to a second device, wherein at least one of the devices is within an optical fiber splice enclosure; and
    disconnecting the middle piece of cable; and
    connecting a quick connect between the first and the second pieces of cable, wherein the first and second cables are respectively connected to the first and second devices.

7. The method of claim 6 wherein the first device is a surge protector and the second device is a ground rod.

8. The method of claim 6 wherein the first device is a surge protector and the second device is a pull block.

9. The method of claim 6 wherein the first device is a surge protector and the second device is a closure.

10. The method of claim 6 wherein the first device is a surge protector and the second device is a waterproof connector.

11. The method of claim 6 wherein the first device is a pull block and the second device is a waterproof connector.

12. A fiber-optic closure for connecting a plurality of fiber-optic cables, at least one of which includes one of a sheath or tracer wire, the closure comprising:
    connectors for connecting fiber-optic strands;
    an output port for connecting an external device or circuit component to an internal circuit element within the closure whereby signals from said internal circuit element may be monitored without opening the closure to gain access to the internal circuit element; and
    an output port for connecting an external device or circuit component to an internal circuit element wherein signals within the closure may be monitored without opening the closure to gain access to the internal circuit element;
    at least one of a filter or surge protector, having an input and an output;
    a circuit node forming an electrical connection between the input of the at least one of a filter or surge protector and the at least one of a sheath or tracer wire; and
    a quick disconnect having a first and a second end, the first end connected to the output of the at least one of a filter or a surge protector, and the second end connected to ground.

* * * * *